United States Patent
Root

(10) Patent No.: US 6,435,759 B1
(45) Date of Patent: Aug. 20, 2002

(54) DEVICE FOR CONNECTING ATTACHABLE SWITCHGEAR CABINETS

(75) Inventor: Paul Root, Bad Endbach (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/600,474
(22) PCT Filed: Dec. 23, 1998
(86) PCT No.: PCT/EP98/08435
§ 371 (c)(1), (2), (4) Date: Jul. 17, 2000
(87) PCT Pub. No.: WO99/37004
PCT Pub. Date: Jul. 22, 1999

(30) Foreign Application Priority Data

Jan. 15, 1998 (DE) .......................... 198 01 185

(51) Int. Cl.[7] ............................. H02B 1/01; F16B 12/10
(52) U.S. Cl. ................. 403/407.1; 403/353; 248/227.1; 248/227.3; 312/111
(58) Field of Search .............................. 403/389, 374.3, 403/373, 374.2; 211/189, 26; 248/226.11, 227.1, 227.3; 312/111; 361/605, 829

(56) References Cited

U.S. PATENT DOCUMENTS

| | | | | |
|---|---|---|---|---|
| 2,947,390 A | * | 8/1960 | Stollenwerk | 211/182 X |
| 4,531,698 A | * | 7/1985 | Sharber | 211/189 X |
| 5,052,565 A | * | 10/1991 | Zachrei | 211/182 |
| 5,211,502 A | * | 5/1993 | Upham-Hill | 403/353 |
| 6,230,903 B1 | * | 5/2001 | Abbott | 361/829 X |

FOREIGN PATENT DOCUMENTS

| | | |
|---|---|---|
| DE | 1 753 051 | 7/1971 |
| DE | 2504721 A1 * | 8/1976 |
| EP | 189 061 | 12/1988 |

* cited by examiner

Primary Examiner—Lynne H. Browne
Assistant Examiner—Ernesto Garcia
(74) Attorney, Agent, or Firm—Pauley Petersen Kinne & Erickson

(57) ABSTRACT

A device for connecting switchgear cabinets which can be attached to each other. The switchgear cabinets have racks with frame sections and form connecting frames extending as far as connecting planes. The frame sections have side sections which are oriented towards an inner space of the switchgear cabinet. Corresponding frame sections of the attached racks are interconnected by one or several connecting elements with a positive fit. The connecting elements are fixed at receptacles of the side sections. In order to provide considerable flexibility in attaching different types of switchgear cabinets, the vertical frame pieces connected to the connecting element have different cross-sectional dimensions, the connecting element is fixed to a fixing receptacle of the first frame section by a first fixing element, and the connecting element grips the second frame section with a clamping element.

10 Claims, 1 Drawing Sheet

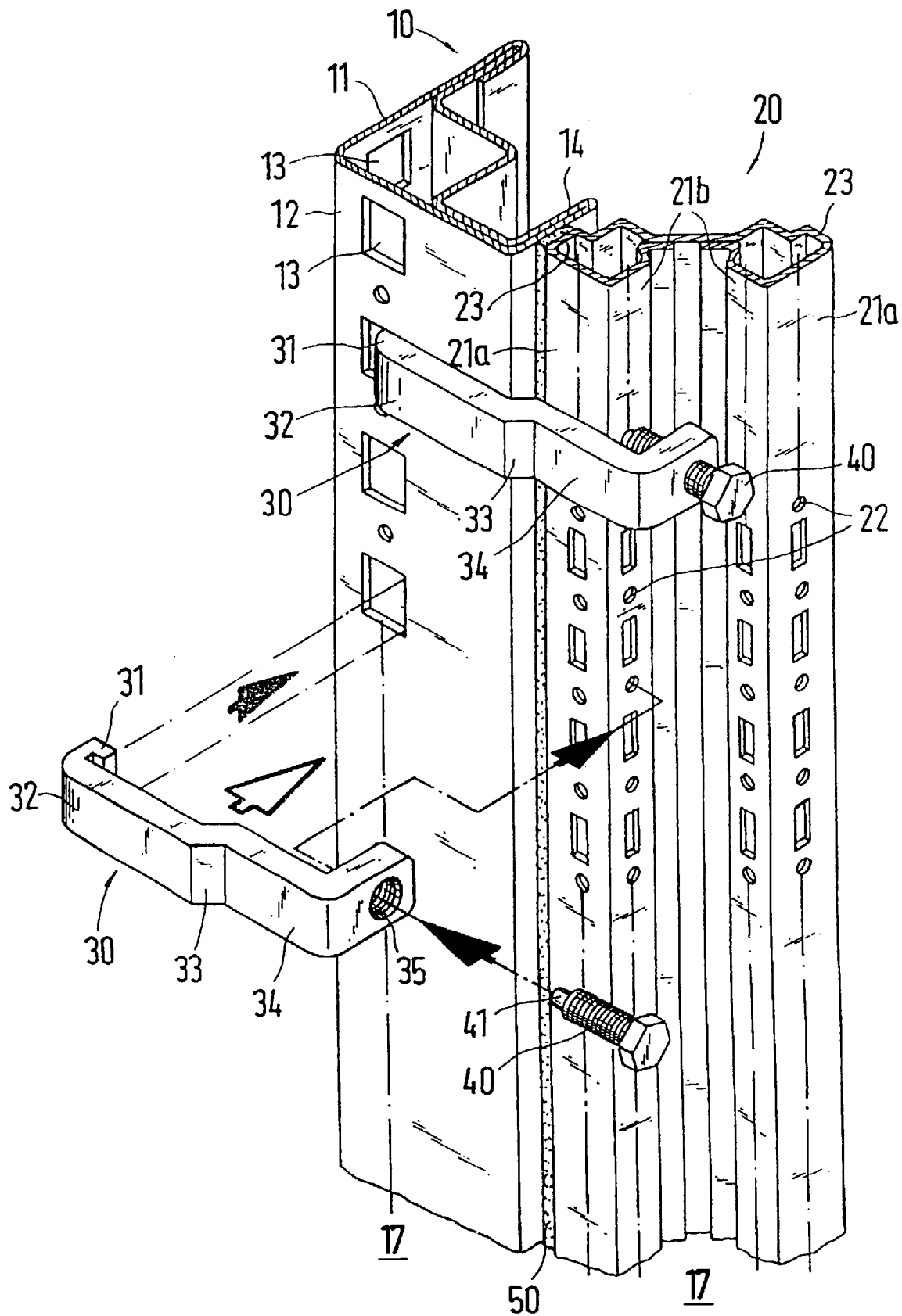

DEVICE FOR CONNECTING ATTACHABLE SWITCHGEAR CABINETS

BACKGROUND OF THE INVENTION

1. Field of the Invention

This invention relates to a device for connecting switchgear cabinets which can be lined up against each other, having racks with profiled frame sections which form connecting frames in a direction of the connecting planes, wherein the profiled frame sections have hollow profiled sections equipped with profiled sides oriented toward the interior of the switchgear cabinet, wherein profiled frame sections of the racks are lined-up, associated with each other, and are interlockingly connected with each other by one or several connectors fixed in place at fastening receivers of the profiled sides.

2. Description of Related Art

Such an arrangement is known from European Patent Reference EP 0 189 061 A1 wherein separate clamping elbows are fastened on the adjoining profiled frame sections of the lined-up profiled frame sections. A clamping slide can be pushed on the clamping elbows. The clamping elbow and the clamping slide form a conically tapering wedge connection, which clamps the profiled frame sections against each other.

The controls of the installations of large factories are housed in switchgear cabinets. Since the volume of a single switchgear cabinet is insufficient, several switchgear cabinets are lined up against each other. Over time, the function sequences of the factory change, so that the installation control must be continuously updated. Because switchgear technology is also developed further and as a result of this other types of switchgear cabinets are created, a second row of switchgear cabinets is placed next to the first one. For making communications between the two rows possible, appropriate cables, supply lines, and the like are positioned. If the factory is converted, the switchgear cabinets must also be relocated. It is then intended with the connecting elements that an entire row can be picked up by a crane and relocated.

SUMMARY OF THE INVENTION

It is one object of this invention to create a device of the type mentioned at the outset, wherein a cost outlay for the switchgear cabinet for the conversion and set-up of a factory is reduced.

This object is achieved with profiled frame sections connected with the connector having different cross-sectional geometries. The connector is fixed in place in a fastening receiver of the first profiled frame section with a first fixation element, and the connector acts on the second profiled frame section by a clamping element.

According to this invention, different profiled frame sections, and therefore different types of switchgear cabinets, can be lined up with each other. When setting up a factory it is therefore not necessary to form several rows of switchgear cabinets. This makes it also possible to keep the cost outlay for a conversion of a factory low, because only one row of switchgear cabinets needs to be manipulated.

In accordance with a preferred embodiment of this invention, the connector is designed in one piece and maintains the clamping element, which is embodied as a fastening screw, in a threaded receiver, wherein a center longitudinal axis of the threaded receiver is arranged at a right angle with the connecting plane. This simply designed connector can be cost-effectively manufactured and produces a highly stable clamping of the two profiled frame sections. It is advantageously possible to exert the clamping force vertically on the connecting plane with the fastening screw.

If the aligned profiled frame sections each have a profiled side oriented toward an interior of the switchgear cabinet and each extends vertically with respect to the connecting plane, and the connector has two legs which extend parallel with each other and rest with level contact faces against the profiled sides, then the two profiled frame sections can be exactly aligned with each other, using the connector.

This is also possible in particular if the profiled sides are offset parallel with each other. Then the two legs of the connector transition into each other by an adapter element, which is arranged in an area of the connecting plane. For securely fixing the connector in place, in accordance with a preferred embodiment of this invention, the connector is suspended by its first fixation element, designed as a hook, in a fastening receiver of the first profiled frame section and is interlockingly supported thereon parallel with the connecting plane. The clamping element acts on a profiled side extending parallel with the connecting plane and is also interlockingly held on parallel with the connecting plane. The interconnected fixation in place of the first fixation element, as well as of the fastening screw, prevents the connector from being inadvertently released out of its clamping position, so that a dependable connection of the aligned profiled frame sections is always assured.

According to this invention the clamping element can be embodied as a fastening screw with a centering pin which engages a fastening bore of the second profiled frame section.

BRIEF DESCRIPTION OF THE DRAWING

This invention is explained in greater detail by one preferred embodiment shown in the drawing in a partial perspective exploded view.

DESCRIPTION OF PREFERRED EMBODIMENTS

The drawing shows two lined-up profiled frame sections 10, 20, which are fixed against each other by means of two connectors 30. The first profiled frame section 10 has two profiled sides 11, 12 at right angles to each other, which are oriented toward an interior 17 of the switchgear cabinet. At its free end, the profiled side 11 transitions into a vertically extending contact edge. At its end, the profiled side 12 is bent at right angles and forms a sealing strip 14, which also extends vertically. Rows of fastening receivers 13 are cut at equal distances from each other into the two profiled sides 11, 12. Built-in equipment units in the interior 17 of the switchgear cabinet can be fastened in the fastening receivers.

The second profiled frame section 20 has a different cross-sectional geometry than the first profiled frame section 10. The second profiled frame section 20 has four profiled sides 21a, 21b, all of which are oriented toward the interior 17 of the switchgear cabinet. The profiled sides 21a each extend at right angles with respect to the profiled outsides formed by the second profiled frame section 20. The profiled sides 21b each adjoin the profiled sides 21a at right angles and form an interior receiver, in which vertically extending mounting rails are installed. A row of fastening receivers 22 is cut into the respective individual profiled sides 21a, 21b. In this case the fastening receivers 22 are alternatingly embodied as bores and slit-shaped openings. Sealing strips 23 are beveled at right angles from the profiled sides 21a. The second profiled frame section 20 can be lined up against the sealing strip 14 of the first profiled frame section 10 in the area of one of the two sealing strips 23. In this case a seal 50 is held between the two sealing strips 23, 14.

Connectors 30 are used for the secure connection of the two profiled frame sections 10, 20. The connector 30 has a first fixation element 31, which is designed in the form of a hook. A leg 32 adjoins the fixation element 31 and transitions into a further leg 34 by means of an adapter element 33. A shoulder, which has a threaded receiver 35, is beveled off the further leg 34. The connector 30 can be suspended in one of the fastening receivers 13 of the profiled side 12 by means of the fixation element 31. The leg 32 has an upper contact face, with which the leg 32 rests against the profiled side 12. The second leg 34 also has a level contact face, which rests flat against the profiled side 21a of the second profiled frame section 20. The two profiled sides 12 and 21a are offset parallel with each other. This offset is compensated by the adapter element 33. Because the contact faces of the two legs 32, 34 are parallel with respect to each other, the profiled sides 12 and 21a and therefore also the profiled frame sections 10, 20 are aligned with respect to each other. A fastening screw 40 can be screwed into the threaded receiver 35 of the connector 30. On its end, the fastening screw 40 has a centering pin 41. When screwing the fastening screw 40 in, the centering pin 41 enters into one of the fastening receivers 22 of the second profiled frame section 20. The connector 30 is fixed in place against the second profiled frame section 20 by means of the centering pin 41 so that it can no longer be displaced parallel with the connecting plane. The first fixation element 31 performs the same function. When the fastening screw 40 is screwed into the threaded receiver 35, the two profiled frame sections 10, 20 are clamped to each other, and the seal 50 is compressed to the required extent.

What is claimed is:

1. In a device for connecting two switchgear cabinets which can be aligned against each other, the switchgear cabinets having aligned racks formed of profiled frame sections (10, 20) and which form connecting frames in a direction of a connecting plane, wherein the profiled frame sections have profiled sides (11, 12, 21a, 21b) oriented toward an interior of the switchgear cabinets, wherein the profiled frame sections (10, 20) of a first cabinet of the cabinets is the aligned racks which are associated with each other are interlockingly connected with one of the profiled frame sections (10, 20) of a second cabinet of the cabinets by at least one connector (30) fixed in place at one of fastening receivers of one of the profiled sides, an improvement comprising:

the profiled frame sections (10, 20) of the first cabinet having cross-sectional geometry different than the geometry of the profiled frame sections (10, 20) of the second cabinet, the at least one connector (30) fixed in place in one of the receivers fastening receiver (13) of a first profiled frame section (10) of the profiled frame sections (10, 20) of the first cabinet by a first fixation element (31), and the connector (30) acting on a second profiled frame section (20) of the profiled frame sections (10, 20) by a clamping element (40).

2. In the device in accordance with claim 1, wherein the connector (30) is one piece and maintains the clamping element (40) which is embodied as a fastening screw in a threaded receiver (35), wherein a center longitudinal axis of the threaded receiver (35) is at a right angle with respect to the connecting plane.

3. In the device in accordance with claim 2, wherein the aligned frame sections each extending vertically with respect to the connecting plane, and the connector (30) has two legs (32, 34) which extend parallel with each other and the legs (32, 34) have contact faces that each rest against one of the profiled sides (21a, 12) of the frame sections.

4. In the device in accordance with claim 3, wherein the profiled sides (12, 21a) are offset parallel with each other, and the two legs (32, 34) of the connector (30) transition into each other with an adapter element (33) which is arranged in an area of the connecting plane.

5. In the device in accordance with claim 4, wherein the connector (30) has a first fixation element designed as a hook suspended in a fastening receiver (13) of the first profiled frame section (10) and is interlockingly supported parallel with the connecting plane, and the clamping element (40) acts on a profiled side (21b) of the second profiled frame section (20) extending parallel with the connecting plane and the clamping element (40) is interlockingly held parallel with the connecting plane.

6. In the device in accordance with claim 5, wherein the clamping element (40) is embodied as a fastening screw having a centering pin (41) which engages a fastening bore of the second profiled frame section (20).

7. In the device in accordance with claim 1, wherein the aligned frame sections each extending vertically with respect to the connecting plane, and the connector (30) has two legs (32, 34) which extend parallel with each other and the legs (32, 34) have contact faces that each rest against one of the profiled sides (21a, 12) of the frame sections.

8. In the device in accordance with claim 7, wherein each profiled side (12, 21a) is offset parallel with each other, and the two legs (32, 34) of the connector (30) transition into each other with an adapter element (33) which is arranged in an area of the connecting plane.

9. In the device in accordance with claim 1, wherein the connector (30) has a first fixation element designed as a hook suspended in a fastening receiver (13) of the first profiled frame section (10) and is interlockingly supported parallel with the connecting plane, and the clamping element (40) acts on a profiled side (21b) of the second profiled frame section (20) extending parallel with the connecting plane and the clamping element (40) is interlockingly held parallel with the connecting plane.

10. In the device in accordance with claim 9, wherein the clamping element (40) is embodied as a fastening screw having a centering pin (41) which engages a fastening bore of the second profiled frame section (20).

* * * * *